(12) United States Patent
Boddenberg et al.

(10) Patent No.: US 11,752,910 B2
(45) Date of Patent: Sep. 12, 2023

(54) ARMREST ARRANGEMENT FOR A MOTOR VEHICLE

(71) Applicant: BOS GmbH & Co. KG, Ostfildern (DE)

(72) Inventors: Jan Boddenberg, Cologne (DE); Andreas Göbbels, Kürten (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 17/748,150

(22) Filed: May 19, 2022

(65) Prior Publication Data

US 2022/0371493 A1 Nov. 24, 2022

(30) Foreign Application Priority Data

May 20, 2021 (DE) .......................... 102021205159.6

(51) Int. Cl.
*B60N 2/75* (2018.01)
(52) U.S. Cl.
CPC ............. *B60N 2/763* (2018.02); *B60N 2/767* (2018.02)
(58) Field of Classification Search
CPC ................................ B60N 2/763; B60N 2/767
See application file for complete search history.

(56) References Cited

U.S. PATENT DOCUMENTS

| | | | |
|---|---|---|---|
| 10,814,762 B2* | 10/2020 | Faccin | B60N 2/753 |
| 2002/0096928 A1* | 7/2002 | Bidare | B60N 2/767 |
| | | | 297/411.32 |
| 2014/0175850 A1* | 6/2014 | Roeglin | A47C 7/543 |
| | | | 297/463.1 |
| 2018/0056830 A1* | 3/2018 | Cripe | F16C 11/10 |
| 2019/0210499 A1 | 7/2019 | Boddenberg et al. | |

FOREIGN PATENT DOCUMENTS

| | | | |
|---|---|---|---|
| DE | 102018200187 A1 | 7/2019 | |
| FR | 2789142 A1 * | 8/2000 | ........... B60N 2/4606 |

* cited by examiner

*Primary Examiner* — Milton Nelson, Jr.
(74) *Attorney, Agent, or Firm* — FLYNN THIEL, P.C.

(57) ABSTRACT

An armrest arrangement having an armrest structure supported in a pivotably movable manner relative to a fixed carrier structure and having an inclination adjustment device which has at least one rotationally movably supported adjustment element which can be displaced along a fixed guide path. The armrest arrangement has an actuation device for activating the inclination adjustment device which is operationally connected to a mechanical coupling in order to release or to block the adjustment element for a rotational movement. A mechanical forced control device which switches an activation of the coupling by the actuation device for a limited inclination angle range of the armrest structure relative to the carrier structure without effect is associated with the coupling.

8 Claims, 4 Drawing Sheets

ARMREST ARRANGEMENT FOR A MOTOR VEHICLE

CROSS REFERENCE TO RELATED APPLICATION

This claims priority from German Application No. 10 2021 205 159.6, filed May 20, 2021, the disclosure of which is hereby incorporated by reference in its entirety.

TECHNICAL FIELD

The invention relates to an armrest arrangement for a motor vehicle. The armrest arrangement has an armrest structure supported in a pivotably movable manner relative to a fixed carrier structure and has an inclination adjustment device with at least one rotationally movably supported adjustment element displaceable along a fixed guide path. The armrest arrangement additionally includes an actuation device for activating the inclination adjustment device operationally connected to a mechanical coupling in order to release or to block the adjustment element for a rotational movement.

BACKGROUND AND SUMMARY

Such an armrest arrangement is known from DE 10 2018 200 187 A1. The armrest arrangement is provided for a passenger motor vehicle and arranged between a driver's seat and a passenger seat of a motor vehicle interior of the passenger motor vehicle. An armrest structure provided with an arm support is supported in a pivotably movable manner relative to a carrier structure fixed to the vehicle. Furthermore, an inclination adjustment device is provided and has two toothed pinions supported in a rotationally movable manner about a common rotation axis on the armrest structure. The toothed pinions mesh with two circular-arc-shaped toothed racks connected to the carrier structure so as to be fixed to the vehicle. The toothed pinions are permanently acted on with torque in one rotation direction by a spring motor. A coupling in the form of a wrap spring is used to block the spring motor, and therefore the toothed pinions, relative to the armrest structure or to release them for a climbing movement along the toothed racks. The wrap spring is released by an actuation device supported on the armrest structure. The actuation device has a Bowden cable which engages at one spring end of the wrap spring in order to be able to open the spring turns of the wrap spring. A frictional engagement of the wrap spring with a fixed bearing, which is associated with the armrest structure, and a movable bearing, which is associated with the toothed pinions, is thereby released.

In armrest arrangements for passenger motor vehicles which have a storage compartment under the pivotably movable armrest structure and which can be closed by the armrest structure acting as a cover, a locking device which locks the armrest structure relative to the storage compartment in the closed position of the storage compartment is provided.

An object of the invention is to provide an armrest arrangement of the type mentioned in the introduction which is suitable for use in connection with a closable storage compartment.

This object is achieved in that a mechanical forced control device, which is associated with the coupling, switches the coupling to an ineffective state, with respect to an activation by the actuation device, for a limited inclination angle range of the armrest structure relative to the carrier structure between 0° and 5°. The solution according to the invention is advantageous if the armrest structure is used for closing a storage compartment in a locked position. This is because, in that the coupling is switched to a forceless and therefore an ineffective state as long as the armrest structure is in an angular range between 0° and 5° relative to a vehicle horizontal, an inadvertent operation of the actuation device cannot lead to an activation of the inclination adjustment device. An increased level of safety for an interior of the motor vehicle is thereby provided if the armrest structure is in a horizontal rest position and advantageously in a locked closed position relative to a storage compartment which is fixed to the vehicle. The solution according to the invention can be used for an armrest arrangement in a particularly advantageous manner, as known from DE 10 2018 200 187 A1. The solution according to the invention improves the armrest arrangement according to DE 10 2018 200 187 A1 in that such an armrest arrangement can be used in connection with a storage compartment which is fixed to the vehicle and which is located under the armrest structure. As a result of the solution according to the invention, the armrest structure is locked securely by means of the locking device in the closed position of the storage compartment without an inadvertent operation of the actuation device being able to apply forces to the locked position of the armrest structure.

In an embodiment of the invention, the forced control device is operationally connected to the coupling in such a manner that the coupling is moved into an idle position thereof by the forced control device over the limited inclination angle range. In the limited inclination angle range between 0° and 5° relative to the horizontal, the coupling is consequently opened so that an operation of the actuation device cannot bring about a change of the functional state of the coupling. This is because the coupling is already open so that operation of the actuation device is ineffective.

In another embodiment of the invention, the coupling has a mechanical wrap spring which couples a fixed bearing of the inclination adjustment device to a movable bearing. The forced control device engages with the wrap spring.

In another embodiment of the invention, the wrap spring is arranged coaxially relative to a rotation axis of the adjustment element and the forced control device has a control sleeve arranged coaxially relative to the rotation axis and coupled to the closing spring. As a result of the coaxial arrangement of the corresponding functional elements, there is a particularly compact structure for these functional elements so that, in spite of the additional provision of the forced control device, no additional structural space for accommodating the forced control device is required.

In another embodiment of the invention, the control sleeve is connected in a rotationally secure manner to a control member supported on a fixed control path in a slidingly movable manner. The control member preferably has a control lever provided with a control pin and which control member slides along a control path of the carrier structure with a corresponding pivoting movement of the armrest structure. The control pin is supported eccentrically on the fixed control path so that a torque which leads to the wrap spring opening is applied to the control sleeve at least over a part-region of the length of the control path.

In another embodiment of the invention, the fixed control path has a control projection arranged on the carrier structure and which brings about a radial control of the control member relative to a pivot axis of the armrest structure. If the control member has a control lever provided with a control pin, the control pin is redirected on the control projection so far that a rotation of the control sleeve, which control sleeve is rotationally secure with respect to the control member, brings about opening of the coupling, preferably the mechanical wrap spring.

BRIEF DESCRIPTION OF THE DRAWINGS

Additional advantages and features of the invention will be appreciated from the following description of a preferred embodiment of the invention which is illustrated with reference to the drawings, in which.

DETAILED DESCRIPTION

An armrest arrangement according to FIGS. 1 to 11 is provided for use in a vehicle interior of a passenger motor vehicle. The armrest arrangement is positioned in an intermediate space between a driver's seat and a passenger seat in a state mounted ready for operation and therefore in the region of a central console of the vehicle interior. The armrest arrangement has an armrest structure 1, 2 which is provided as a cover of a storage compartment, which is not illustrated, in the region of the central console of the vehicle interior. The armrest structure 1, 2 is supported in a pivotably movable manner on a carrier structure 3. The carrier structure 3 is fixed to the vehicle and is moveable about a pivot axis which is elongate in the transverse vehicle direction. In a manner not described in greater detail herein, the armrest structure 1, 2 is pivotably moveable between an at least substantially horizontal closed position and a release position in which the armrest structure 1, 2 extends upwards in a vertical direction of the vehicle. In the closed position, the armrest structure 1, 2 closes the upwardly open storage compartment of the central console. In the release position, the armrest structure 1, 2 is pivoted upwards so far that free access to an interior of the storage compartment is provided. In the closed position, the armrest structure 1, 2 is further locked (in a manner not illustrated in greater detail) to an edge region of the storage compartment fixed to the vehicle by a locking device (also not illustrated in greater detail).

Figure 1:
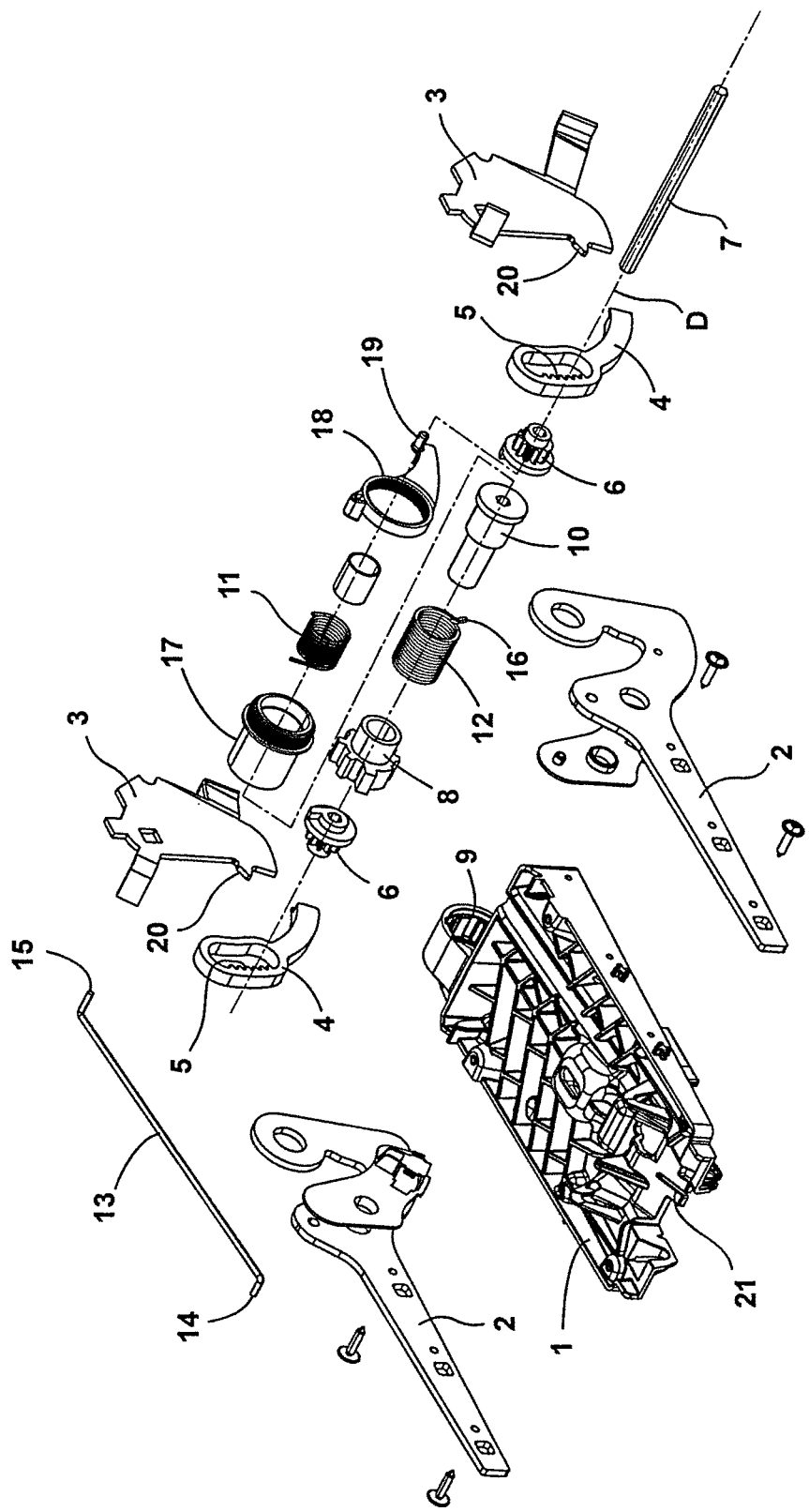
FIG. 1 shows an exploded illustration of an embodiment of an armrest arrangement according to the invention.
Figure 2:
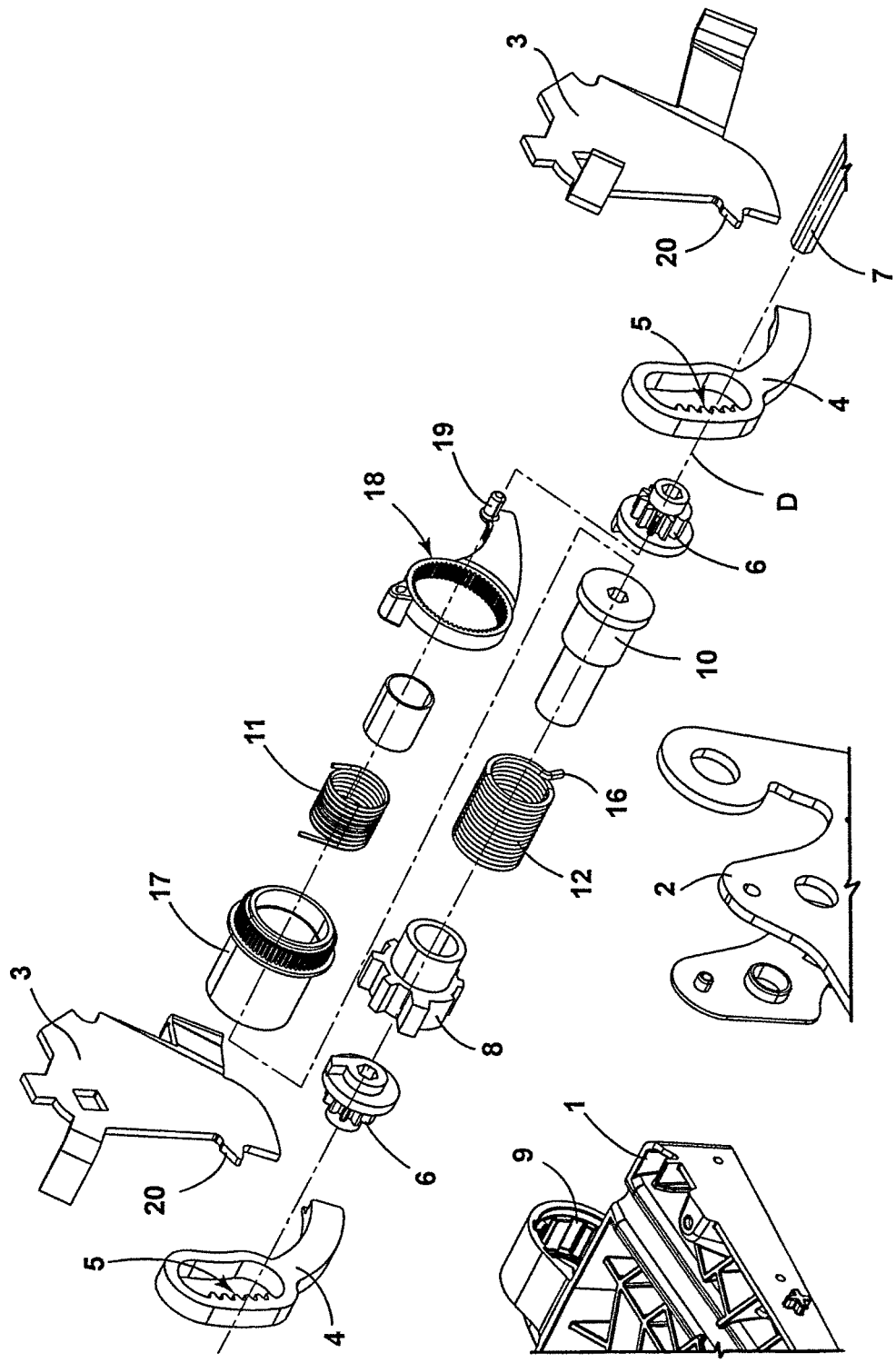
FIG. 2 shows an enlarged illustration of a partial region of the exploded illustration according to FIG. 1.

In addition to the described pivot movement of the armrest structure 1, 2, the armrest structure 1, 2 can additionally be adjusted within limited angle ranges between an angle of 5° relative to a horizontal and an angle less than 30° relative to the horizontal by an inclination adjustment device, which can readily be seen in FIGS. 1 and 2, and can be blocked in the adjusted inclination position. This additional function is provided to achieve an individually adjustable arm support for a driver or a passenger in the vehicle interior by the armrest structure, by means of which an elbow or a forearm of the respective person can be supported at a desired, ergonomically favourable height on a corresponding upholstery item of the armrest structure. In an angle range between 0° and 5° relative to the horizontal, no blocking by the inclination adjustment device is possible, as will be set out below.

In the region of the carrier structure 3, the inclination adjustment device has two support arms 4 which can be locked in a manner fixed to the vehicle and which support arms 4 comprise a toothed rack 5 acting as a guide path and being curved in the manner of a circular arc. The two toothed racks 5 are curved concentrically relative to the pivot axis of the armrest structure 1, 2. The two toothed racks 5 are part of a kidney-shaped surround of the respective support arm 4. The two support arms 4 are locked to the carrier structure 3 so as to be fixed to the vehicle for the function of the inclination adjustment device. In order to be able to pivot the armrest structure 1, 2 beyond this limited inclination adjustment angle range, however, the two support arms 4 are releasable from the position thereof locked to the carrier structure 3 and can be pivoted together with the armrest structure 1, 2 in the direction of the release position. The unlocked functional position of the support arms 4 can be seen in FIGS. 6 and 10.

Two toothed pinions 6, which act as adjustment elements and which are retained together in a rotationally secure manner on an axle rod 7, which axle rod 7 is in the form of a multi-sided longitudinal profile, mesh with the toothed racks 5 acting as a fixed guide path. The toothed pinions 6 including the axle rod 7 are supported in a rotationally movable manner relative to the armrest structure 1, 2 about a rotation axis D orientated parallel with the pivot axis of the armrest structure 1, 2. The toothed pinions 6 are driven in a rotation direction by a spring motor 11. The spring motor 11 is provided coaxially relative to the rotation axis D in the region of a bearing (described in greater detail below) of the toothed pinions 6. This bearing has a fixed bearing 8 retained in a rotationally secure manner in a fixed bearing receiving member 9 of the armrest structure 1, 2. A movable bearing 10 is connected in a rotationally secure manner to the toothed pinions 6 and the axle rod 7 is rotatably supported about the rotation axis D in a manner coaxial to the fixed bearing 8. The spring motor 11 acts on this movable bearing 10 with permanent pretensioning.

The spring motor 11, and therefore a rotational ability of the movable bearing 10 relative to the fixed bearing 8, can be blocked by a wrap spring 12. The wrap spring 12 is arranged coaxially relative to the rotation axis D on a cylindrical outer covering of the fixed bearing 8 on one hand, and a cylindrical outer covering of the movable bearing 10 on the other hand. The wrap spring 12 acts as a non-positive-locking coupling and therefore, in this instance, as a non-positive-locking brake between the fixed bearing 8 and the movable bearing 10. In a clamped position of the wrap spring 12 acting as a wrap brake, corresponding spring turns of the wrap spring 12 engage around both the cylindrical outer covering of the fixed bearing 8 and the complementary cylindrical outer covering of the movable bearing 10 in a non-positive-locking manner so that no relative rotation is possible between the movable bearing 10 and the fixed bearing 8. In order to release the wrap spring 12 and therefore to release the wrap brake, the armrest structure 1, 2 is associated with an actuation device 13 to 15 which comprises an actuation rod 13 displaced approximately radially relative to the rotation axis D and longitudinally displaceable to a limited extent. With a rear end region 15, the actuation rod 13 can contact a radially protruding wrap spring end 16 of the wrap spring 12 in order to allow at least one spring turn of the wrap spring 12 to be opened. An opposite front end 14 of the actuation rod 13 is coupled in a manner not illustrated in greater detail to an actuation handle which is movably supported on the armrest structure 1, 2. During operation of the actuation handle, consequently, the wrap spring end 16 can be displaced in a circumferential direction, whereby a corresponding spring turn of the wrap spring 12 resiliently increases together with directly adjacent spring turns. The non-positive locking connection acting on the cylinder covering of the movable bearing 10 is thereby cancelled and the spring motor 11 can rotationally move the toothed pinions 6. The toothed pinions 6 thereby climb along the toothed racks 5 upwards as far as an upper end position.

In order to switch the coupling, in the form of the wrap spring 12, to an ineffective state with respect to the actuation device in a lower inclination angle range between 0°, that is to say, an orientation of the armrest structure 1, 2 in the closed position, and in this case 5° relative to the horizontal (see FIGS. 4 to 6), the inclination adjustment device is further associated with a forced control device which is described in greater detail below.

Figure 3:
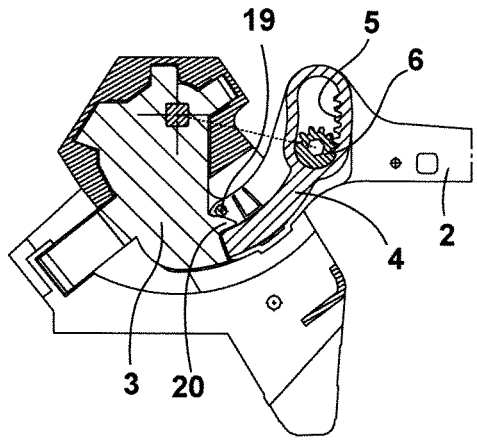
FIGS. 3 to 6 show different functional states of an armrest structure of the armrest arrangement according to FIGS. 1 and 2 between a horizontal rest position and an upwardly pivoted intermediate position.
Figure 4:
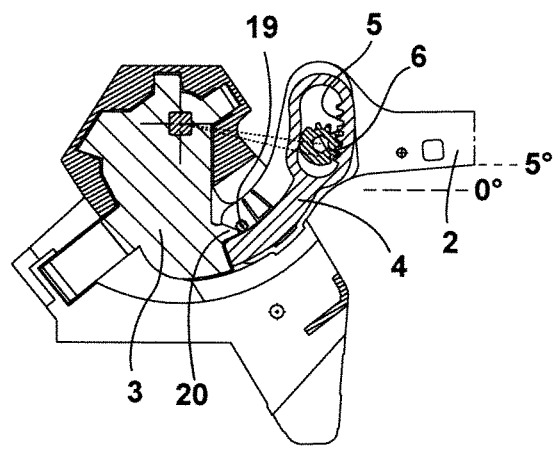
Figure 5:
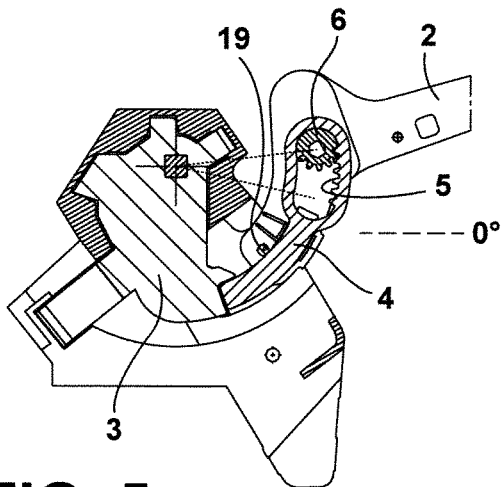
Figure 6:
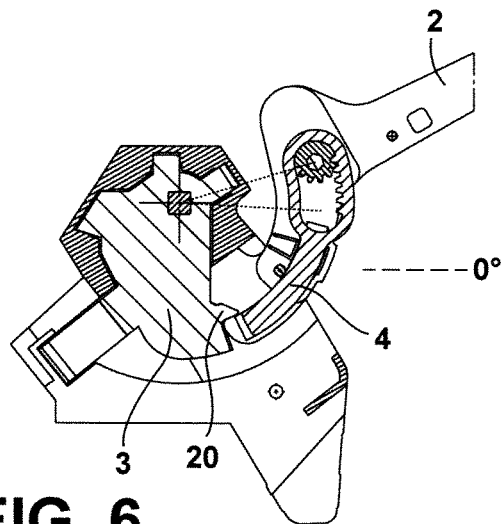
Figure 7:
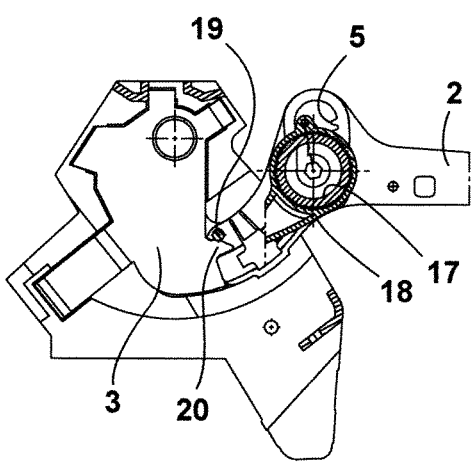
FIGS. 7 to 10 show a sectional illustration, displaced in the transverse vehicle direction relative to the sectional illustrations according to FIGS. 3 to 6, of the functional states according to FIGS. 3 to 6.
Figure 8:
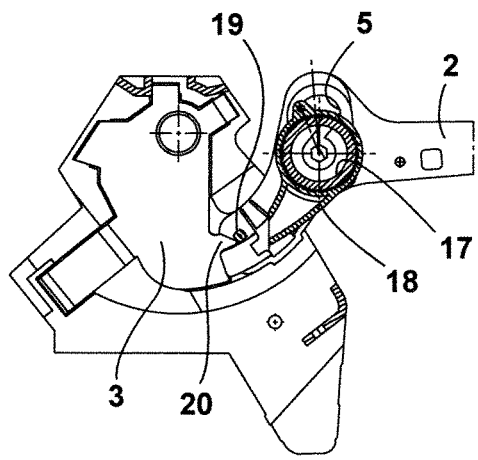
Figure 9:
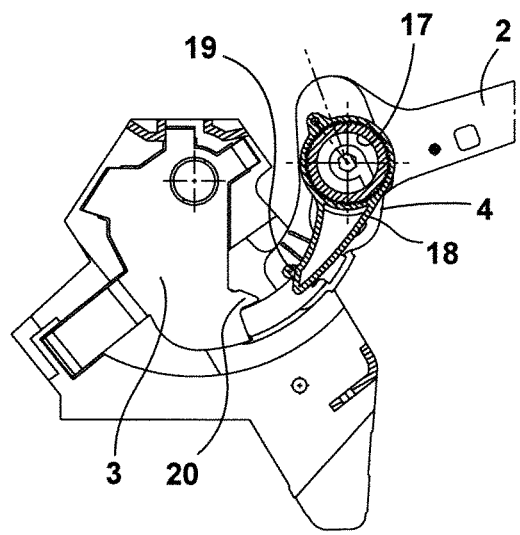
Figure 10:
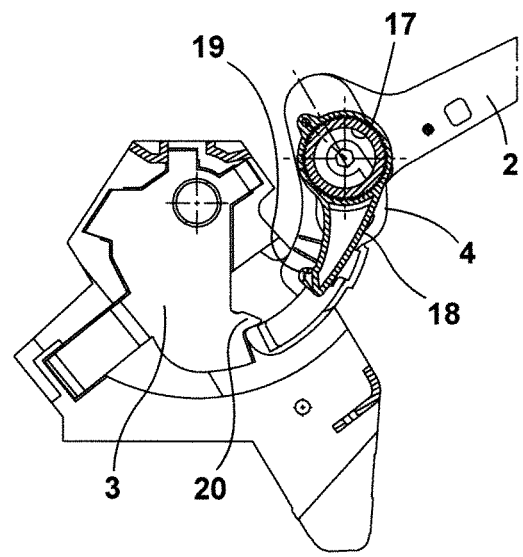
Figure 11:
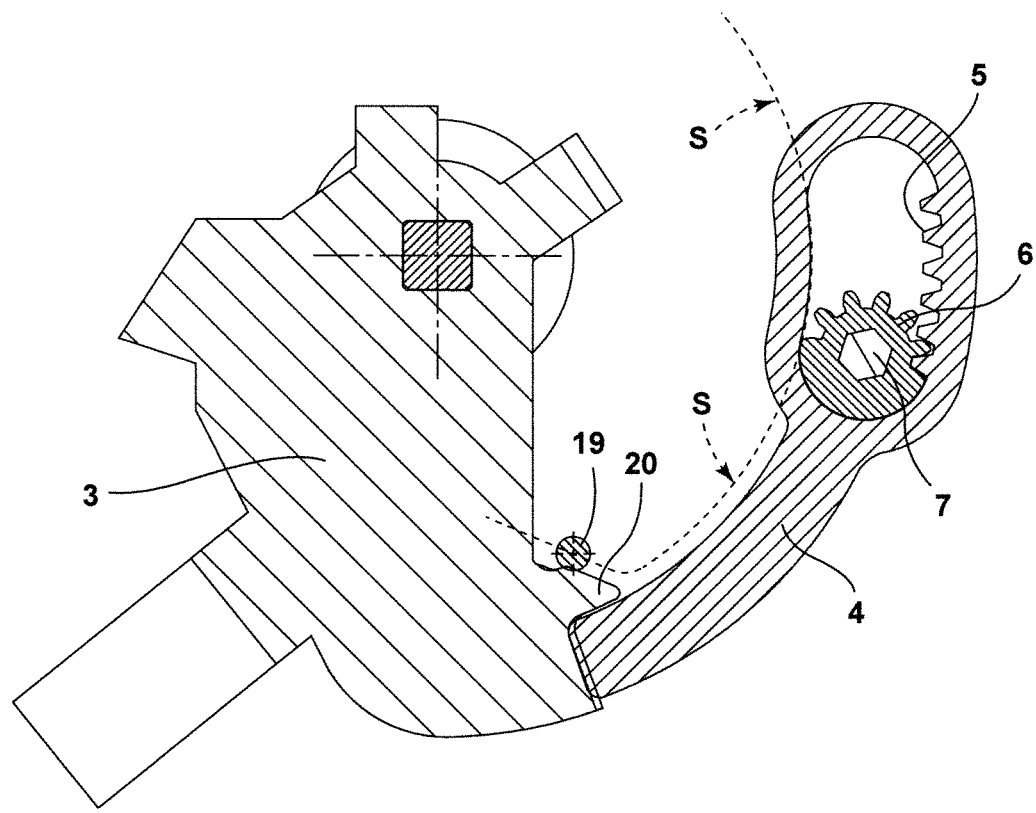
FIG. 11 shows an enlarged sectional view of a partial region of the armrest arrangement according to FIGS. 1 to 10.

Two forwardly projecting control projections 20 which are part of a control path, which is fixed to the vehicle and therefore fixed in position, are provided on the carrier structure 3 and therefore in a manner fixed to the vehicle at corresponding carrier fittings of the carrier structure 3. Furthermore, a control sleeve 17 associated with the moveable bearing 10 is rotationally movably supported coaxially relative to the rotation axis D relative to the fixed bearing 8, and is connected to the wrap spring end 16 of the wrap spring 12 in a rotationally engaging manner. Additionally, a control member 18 is connected to the control sleeve 17. The control member 18 has a fine tooth arrangement ring orientated coaxially relative to the control sleeve 17 and an integral lever arm which projects radially and therefore eccentrically. The control member 18 is connected to the control sleeve 17 in a rotationally secure manner. The control sleeve 17 has a fine tooth arrangement which complements the fine tooth arrangement ring of the control member 18 and via which arrangements the control member 18 and the control sleeve 17 can be fitted together axially in a desired orientation and thus can be connected to each other in a rotationally secure manner. A control pin 19 of the control member 18 projects parallel with the rotation axis D in the transverse vehicle direction laterally from the lever arm of the control member 18. The control pin 19 is integrally formed on the lever arm which acts as a control lever. The control pin 19 is permanently supported in a mounted, ready for operation state on a support portion fixed to the vehicle, that is to say, depending on the position of the armrest structure 1, 2 on the control projection 20 of the fitting of the carrier structure 3 or on a circular-arc-shaped abutment contour of the support arm 4. The abutment contour and the control projection 20 define a control path according to the invention on which the control pin 19 is supported in a slidingly movable manner. Depending on the position of the control pin 19, consequently, the control member 18 (and therefore also the control sleeve 17) are rotated relative to the rotation axis D to a greater or lesser extent. In the more powerfully rotated functional position of the control member 18 and the control sleeve 17, the control sleeve 17 carries the wrap spring end 16 in the opening direction so that the wrap spring 12 is moved into a release position, in which the movable bearing 10 is released for a rotational movement relative to the fixed bearing 8. As such, the wrap brake is opened. This release position is defined by a position of the control pin 19 on the control projection 20, as can be seen in FIGS. 3, 7 and 11. As soon as the control pin 19 according to FIG. 11 has reached the abutment contour in the region of the support arm 4, the control sleeve 17 is rotated backwards again to such an extent that the wrap spring end 16 is again in the blocking position of the wrap spring 12.

In the limited inclination angle range between 0° and 5° (see FIGS. 3 and 4 and 7, 8), consequently, operation of the actuation handle, coupled to the actuation rod 13, of the actuation device is ineffective since the wrap spring 12 is already opened by the control sleeve 17. As soon as the control pin 19 has reached the position according to FIGS. 4 and 8, however, the control sleeve 17 is rotated backwards so far that the wrap spring end 16 is again in the blocking position fixing the fixed bearing 8 and movable bearing 10 relative to each other. From this inclination angle, consequently, the actuation device again also engages as soon as the actuation handle is operated accordingly. The actuation rod 13 opens the wrap spring end 16 in the event of operation of the actuation handle and therefore the wrap spring 12 again, wherein the actuation device also necessarily rotates the control sleeve 17 again in a simple manner. This is because, since the wrap spring end 16 is coupled to the control sleeve 17 in a rotationally engaging manner, the control sleeve 17 necessarily also rotates therewith. In this case, the control pin 19 is necessarily also moved away from the corresponding control path again, for example, therefore, away from the abutment contour on the support arm 4. However, it remains inoperative.

The invention claimed is:

1. An armrest arrangement for a motor vehicle comprising:
   a fixed carrier structure;
   an armrest structure supported in a pivotably movable manner relative to the fixed carrier structure;
   an inclination adjustment device having at least one rotationally movably supported adjustment element displaceable along a fixed guide path, and a mechanical coupling configured to release or block a rotational movement of the adjustment element;
   an actuation device for activating the inclination adjustment device, the actuation device being operationally connected to the mechanical coupling to adjust an inclination of the armrest structure; and
   a mechanical forced control device associated with the mechanical coupling, the mechanical forced control device switching the mechanical coupling to an ineffective state, with respect to an activation by the actuation device, within a limited inclination angle range of the armrest structure relative to the carrier structure.

2. The armrest arrangement according to claim 1, wherein the mechanical forced control device is operationally connected to the mechanical coupling such that the mechanical coupling is moved into an idle position by the mechanical forced control device over the limited inclination angle range.

3. The armrest arrangement according to claim 1, wherein the mechanical coupling comprises a mechanical wrap spring and the inclination adjustment device comprises a fixed bearing and a moveable bearing, the mechanical wrap spring coupling the fixed bearing of the inclination adjustment device to the movable bearing of the inclination adjustment device.

4. The armrest arrangement according to claim 3, wherein the mechanical wrap spring is arranged coaxially relative to a rotation axis of the adjustment element and the mechanical forced control device has a control sleeve arranged coaxially relative to the rotation axis and coupled to the mechanical wrap spring in a rotationally engaging manner.

5. The armrest arrangement according to claim 4, further including a control member, the control sleeve being connected in a rotationally secure manner to the control member, the control member being supported on a fixed control path in a slidingly movable manner.

6. The armrest arrangement according to claim 5, wherein the carrier structure includes a control projection defining a fixed control path, the control projection bringing about a radial control of the control member relative to a pivot axis of the armrest structure.

7. The armrest arrangement according to claim 1, wherein the limited inclination angle range is between 0° and 5°.

8. The armrest arrangement according to claim 1, wherein the mechanical forced control device is configured to place the mechanical coupling in the ineffective state when the armrest structure is disposed within the limited inclination angle range such that inadvertent activation of the actuation device has no effect on a functional state of the mechanical coupling in the limited inclination angle range.

\* \* \* \* \*